United States Patent Office 3,297,536
Patented Jan. 10, 1967

3,297,536
METHOD OF TREATING SKIN AND REDUCING PORE SIZE
Robert R. Baron, Presidential Apartments, Philadelphia, Pa. 19131
No Drawing. Filed Sept. 15, 1964, Ser. No. 396,709
5 Claims. (Cl. 167—90)

This invention relates to the use of a preservative or "finish" for cosmetic "make-up," and it particuarly relates to a "finish" of this type which enhances the appearance of the "make-up" on the skin of the wearer.

Most women throughout the world today use cosmetics, particularly on their faces. One of the basic problems, however, in the use of such cosmetics is that even though much time may be spent in the application thereof in order to obtain the most desirable appearance, the cosmetics, such as face powder, rouge or the like, soon wear or "run" off because of the action of perspiration, rain, wind, abrasive dust, etc.

It is one of the objects of the present invention to overcome the above and other problems inherent in the use of cosmetics by providing a composition and a method of application thereof which preserves the "make-up," once it is applied to the skin, against rapid wear or deterioration despite the deleterious actions of moisture, wind, abrasive dust, and the like.

Another object of the present invention is to provide a composition and a method of application thereof which removes the undesirable "shine" from the "make-up" and provides a mat-like finish thereto.

Another object of the present invention is to provide a composition and a method of application thereof which, in addition to preserving the "make-up" on the skin, also acts to refresh the skin and to prevent the accumulation of dirt and dust thereon.

Another object of the present invention is to provide a composition and a method of application thereof which, in addition to the other functions noted above, serves to retain the pores of the skin in a relatively closed or diminished size, and thereby helps to prevent the clogging of the skin and the formation of blemises and blackheads.

Other objects of the present invention will become apparent from the following detailed description and claims.

In accordance with the present invention, after the cosmetics have been applied to the skin, they are fixed in the desired form by applying thereto a fine spray of a mixture of perfume and an anhydrous denatured alcohol. The alcohol not only serves to cool the skin but its coolness acts to diminish the size of the pores and to close them around the particles of cosmetics, whereby these particles are held tightly by the pores and are prevented from quickly falling or running off. It is important that this application of the alcohol and perfume mixture be in a fine mist, such as is provided by a spray, because not only does such a spray provide an application which is "dry" but it also forms a "breathing" or porous type of coating because of the close spacing of the fine particles of the sprayed mist.

For longer staying power it is often desirable, especially under hot lights, humid weather, or the like, to apply this spray both before and after the "make-up" is applied.

The coating is formed by the denaturing substance in the alcohol as well as by the oil in the perfume. Although such denaturing substance and oil are present in only small quantities, it is sufficient to form the very fine coating desired when applied in the form of a fine spray.

It is important that the composition be "dry" because if it were applied wet, the very purpose for which the product is used would be obviated. However, when the composition is applied in a fine spray, since the alcohol is anhydrous, it is dry when it touches the skin.

The preferable alcohol is SDA–40, which is ethyl alcohol containing small amounts of alkaloid brucine or brucine sulfate and tertiary butyl alcohol. The perfume may be any desirable oily fragrance such as phenyl ethyl alcohol, alpha or beta ionone, methyl ionone, bergamot oil, oil of lavender, vanillin, methyl cinnamate, heliotropin, etc.

The propellant is preferably a mixture of two Freons, namely Freon–11 (trichlorofluoromethane, $CCl_3F$) and Freon–12 (dichlorodifluoromethane, $CCl_2F_2$). Normally, the two Freons are used in equal parts. However, if if it is desired to obtain a colder spray, the proportion of the Freon–11 is increased relative to the Freon–12, whereas it is relatively decreased to provide a warmer spray. In general, the Freon–11 should not be used in an amount above about 52% by weight because the mixture would then become undesirably wet. It is, however, feasible to use only about 1% by weight of the Freon–11 and it may even be omitted if it is desired to rely only on the coldness of the alcohol.

The following examples are illustrative of the invention:

*Example 1*

| Component: | Percent by wt. |
|---|---|
| SDA–40 | 4.5 |
| Freon–11 | 47.6 |
| Freon–12 | 47.6 |
| Oil of lavender | 0.3 |

The alcohol and the oil of lavender are mixed together and kept at room temperature for about ten days. This mixture is then placed in a metal aerosol container, together with the Freon–11 and Freon–12, and the container is sealed. The product is now ready for use.

*Example 2*

| Component: | Percent by wt. |
|---|---|
| SDA–40 | 4.5 |
| Freon–11 | 52.0 |
| Freon–12 | 43.2 |
| Heliotropin | 0.3 |

The above components are mixed and treated in the same manner as in Example 1, and inserted in an aerosol container in the same manner to provide the final product. This product is somewhat colder than that of Example 1 when applied to the skin and is preferably used to cool and refresh the skin in warmer climates or to diminish the pores of excessively oily skin.

*Example 3*

| Component: | Percent by wt. |
|---|---|
| SDA–40 | 4.5 |
| Freon–11 | 49.0 |
| Freon–12 | 44.0 |
| Alpha ionone | 2.5 |

If a greater degree of coating is desired, an additional waxy or oily substance such as lanolin, beeswax, paraffin wax, coconut oil, etc. may be added to the above formulation. This is illustrated as follows.

*Example 4*

| Component: | Percent by wt. |
|---|---|
| SDA–40 | 5.5 |
| Freon–11 | 46.0 |
| Freon–12 | 46.0 |
| Phenyl ethyl alcohol | 0.2 |
| Lanolin (anhydrous) | 2.3 |

Although this preparation has been described above as being used for finishing "make-up," it can also be used on the bare skin to eliminate oily apppearance. It is also to be noted that the alcohol has a germicidal effect on the skin.

The preparation can also be used as an after-shave lotion imparting both fragrance and closing the pores, as well as having a germicidal effect. It can also be used as a refreshant for the skin, giving that so-called "clean" feeling.

Obviously, many modifications of the present invention are possible in the light of the above teachings. It is, therefore, to be understood that within the scope of the appended claims, the invention may be practiced otherwise than as specifically described.

The invention claimed is:

1. A method of conditioning the skin and retaining diminished skin pore size which comprises spraying the skin with an aerosol mixture consisting essentially of an anhydrous denatured lower alkyl alcohol and a propellant, said propellant consisting essentially of dichlorodifluoromethane and trichlorofluoromethane wherein the trichlorofluoromethane is present in a proportion of no more than 52% by weight of the mixture, the propellant constituting at least 90% by weight of the composition.

2. The method of claim 1 wherein the proportion of propellant to alcohol is between about 15:1 and 21:1.

3. The method of claim 1 wherein the mixture includes an effective amount of an oily perfume.

4. The method of claim 1 wherein the mixture includes an effective amount of a fatty-acid lubricant.

5. The method of claim 1 wherein the alcohol contains a member of the group consisting of alkaloid brucine, brucine sulfate, tertiary butyl alcohol and mixtures thereof.

References Cited by the Examiner

Shepard Aerosols: Science and Technology, Interscience Publisher, Inc., New York, 1961, pp. 344–350.

SAM ROSEN, *Primary Examiner.*

DALE R. MAHANAND, *Assistant Examiner.*